Patented Aug. 2, 1949

2,478,048

UNITED STATES PATENT OFFICE 2,478,048

SULFANILAMIDOINDAZOLES AND METHOD OF PRODUCTION

Charles Edward Kwartler, Albany, N. Y., assignor, by mesne assignments, to Winthrop-Stearns Inc., New York, N. Y., a corporation of Delaware No Drawing. Application January 23, 1943, Serial No. 473,388

7 Claims. (Cl. 260—239.6)

This invention relates to compounds useful for the treatment of bacterial infections. The new compounds are derivatives of sulfanilamide in which one of the N'-hydrogen atoms is replaced by the indazolyl radical. The new compounds are therefore also derivatives of the heterocycle indazole, which has the formula:

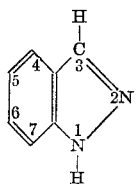

The new compounds of the present invention may be called either sulfanilamido-indazoles or N'-indazolyl-sulfanilamides and in general they may be represented by the formula:

In this formula the $C_7H_5N_2$ radical is the indazolyl radical. It will be appreciated that the sulfanilamido substituent may occupy any of the positions 3, 4, 5, 6 or 7 in the indazole ring.

In general the simplest method for preparing the new compounds is to react acetylaminobenzenesulfonyl chloride with the appropriate aminoindazole. The reaction is preferably conducted in the presence of an acid-binding agent such as a tertiary base or sodium carbonate or sodium hydroxide or the like. However, other methods for the preparation of the new compounds can also be used, for instance, p-nitrobenzenesulfonyl chloride can be reacted with the aminoindazole and the nitro group subsequently reduced to an amino group. Alternatively, the appropriate halo-indazole, e. g. a chloro-indazole or bromo-indazole, can be reacted with p-nitrobenzenesulfonamide and the nitro group reduced to an amino group.

The following examples will serve to illustrate the invention.

Example 1

(a) The known 6-amino-indazole may be prepared by methods described in the literature from the known 6-nitro-indazole. However, a better method of preparation is as follows:

A suspension of 41 grams of 6-nitro-indazole and 20 grams of Raney nickel catalyst in 400 cc. of methanol is placed in an autoclave. Then hydrogen is introduced until the pressure is 400 pounds, after which the temperature is raised to and maintained at 50° C. until reduction is complete. This usually requires up to 8 hours. Then the autoclave is opened, the mixture filtered, and the filtrate concentrated to ⅓ its initial volume. To the concentrated liquor 1500 cubic centimeters of water is added. The clear solution soon crystallizes and crystallization is completed by cooling to 5° C. The crystal crop is collected and dried at 100° C.

The yield of 6-amino-indazole, M. P. 204–205° C., is 27 grams or 81% of theory. On recrystallization the melting point can be raised to 209–210° C.

(b) To a solution of 20 grams of 6-amino-indazole in 200 cubic centimeters of acetone is added dropwise a solution of 39 grams of p-acetylaminobenzenesulfonyl chloride in 200 cubic centimeters of acetone while keeping the reaction mixture cooled by means of an ice-salt bath and also maintaining the reaction mixture slightly alkaline by careful addition of 10% sodium hydroxide. After the reactants have been mixed, the solution is stirred at room temperature for 15 hours, and then the alkaline solution is neutralized with 10% hydrochloric acid. The precipitated acetylaminobenzenesulfonylamino-indazole is collected and purified by dissolving in sodium hydroxide, clarifying with decolorizing carbon and reprecipitating by addition of acetic acid in the cold.

(c) The purified acetyl derivative is de-acetylated by suspending it in 250 cubic centimeters of 6-normal hydrochloric acid and refluxing the mixture for 30 minutes. The mixture is clarified with charcoal and filtered hot. Then the solution is cooled, made strongly alkaline and filtered to remove impurities. On acidifying the cool filtrate with glacial acetic acid, 6-sulfanilamido-indazole having the formula:

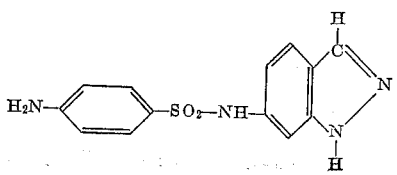

and a melting point of 188–190° C. is obtained. After recrystallization from acetone-water and from alcohol-water, the melting point is raised to 192–194° C. 6-sulfanilamido-indazole is soluble in pyridine, acetone, alcohol, and propylene glycol. It is insoluble in water, chloroform, or benzene.

*Example 2*

(a) The known 5-amino-indazole may be prepared from the known 5-nitro-indazole according to methods described in the literature or by a procedure analogous to that of Example 1 (a).

(b) To 12 grams of 5-amino-indazole in 50 cubic centimeters of pyridine is added, dropwise, 20 grams of p-acetylaminobenzenesulfonyl chloride in 50 cubic centimeters of pyridine. The mixture turns hot and develops a red color. After standing over night at 20–30° C., the mixture is warmed on a steambath for one hour and then cooled and poured onto ice. The resulting precipitate is collected and purified by dissolving it in hydrochloric acid and reprecipitating with ammonium hydroxide. The product so obtained melts at 243–247° C. The melting point can be raised to 249–252° C. by redissolving the product in hydrochloric acid and re-precipitating with ammonium hydroxide.

(c) The acetylaminobenzenesulfonamido-indazole obtained as described above weighs about 25 grams and is de-acetylated by refluxing it with 160 cubic centimeters of 20% sulfuric acid for about 90 minutes. The hot solution is clarified by treatment with filtercell and decolorizing carbon. The clear filtrate thus obtained is treated with an excess of saturated sodium acetate solution to precipitate the desired 5-sulfanilamido-indazole. The precipitate is collected and dried. The yield is 17 grams. The product may be purified by dissolving in sodium hydroxide, reprecipitating with acetic acid and by recrystallization from 50% aqueous acetic acid.

5-sulfanilamido-indazole can also be prepared according to the procedure of Example 1, substituting 5-amino-indazole for the 6-amino-indazole used therein.

*Example 3*

(a) To a solution of 20 grams of 7-amino-indazole in 200 cubic centimeters of acetone and 50 cubic centimeters of water is added dropwise, with ice-cooling, a solution of 39 grams of p-acetylaminobenzenesulfonyl chloride in 200 cubic centimeters of acetone, while also adding 85 cubic centimeters of 10% sodium hydroxide at a rate sufficient to keep the reaction mixture slightly alkaline. After the reactants have been completely added and mixed, the reaction mixture is allowed to stand over night at room temperature and then the resulting clear solution is neutralized with 10% hydrochloric acid. On diluting this solution with 1 liter of cold water, 7-acetylaminobenzenesulfanilamido-indazole separates and can be collected by filtration.

(b) This compound is de-acetylated by refluxing it in 250 cubic centimeters of 6-normal hydrochloric acid for 30 minutes. The hydrolysate is cooled and the 7-sulfanilamido-indazole is precipitated by careful neutralization with alkali. The product is collected and dried and may thereafter be recrystallized from alcohol-water. It melts at about 250° C.

3-amino-indazole or 4-amino-indazole may be substituted for the amino-indazoles employed in the above example, thereby obtaining 3-sulfanilamido-indazole or 4-sulfanilamido-indazole, respectively.

What I claim as my invention is:

1. A sulfanilamido-indazole having the formula:

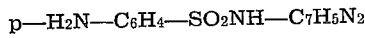

in which the sulfanilamido group

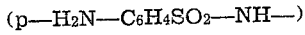

is attached to a carbon atom of the indazole ring.

2. 6-sulfanilamido-indazole having the formula:

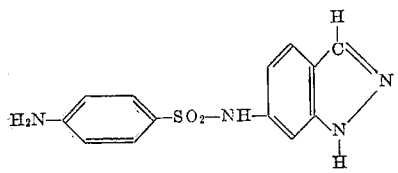

and melting at approximately 192–194° C.

3. The process of preparing a sulfanilamido-indazole having its sulfanilamido group attached to a carbon atom of the indazole ring which comprises reacting a p-acylaminobenzenesulfonyl chloride with a suitable amino-indazole and hydrolyzing the intermediately formed acylaminobenzenesulfonylamino-indazole by heating the latter with an aqueous mineral acid.

4. A compound of the group consisting of those represented by the following general formula:

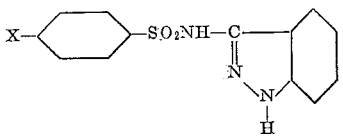

in which X is a member of the group consisting of amino radicals and radicals hydrolyzable to an amino group.

5. The compound having the following formula:

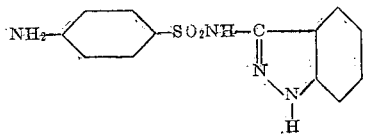

6. The process of producing the compound of the formula

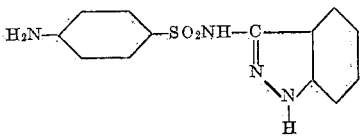

which comprises reacting 3-amino-indazole with an $N^4$-acetylsulfanilyl halide and hydrolyzing the resultant product to 3-sulfanilamido indazole.

7. 5-sulfanilamidoindazole having the formula:

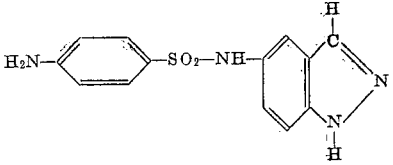

CHARLES EDWARD KWARTLER.

(References on following page)

REFERENCES CITED

The following references are of record in the file of this patent:

UNITED STATES PATENTS

| Number | Name | Date |
|---|---|---|
| 2,259,222 | Ewins | Oct. 14, 1941 |

FOREIGN PATENTS

| Number | Country | Date |
|---|---|---|
| 517,272 | Great Britain | Jan. 25, 1940 |

OTHER REFERENCES

Journal Amer. Chem. Soc., Aug. 1940, pp. 2002–2005.

Chemical Reviews, Aug. 1940, pp. 99 and 103–110.

Journal Amer. Chem. Soc., Oct. 1941, pp. 2739–2740.

Current Science, vol. 11, page 146 (April 26, 1942).

Chem. Abstracts, vol. 14, page 3666.
Chem. Abstracts, vol. 20, pp. 2496–2497.
Chem. Abstracts, vol. 21, page 2693.